United States Patent [19]
Ichimura et al.

[11] Patent Number: 5,087,814
[45] Date of Patent: Feb. 11, 1992

[54] METHOD AND APPARATUS FOR COUNTING CHARGED PARTICLES

[75] Inventors: Shingo Ichimura, Tsukuba; Kiyohide Kokubun, Ibaraki; Hazime Shimizu, Tsukuba, all of Japan

[73] Assignee: Agency of Industrial Science & Technology, Ministry of International Trade & Industry, Tokyo, Japan

[21] Appl. No.: 547,159

[22] Filed: Jul. 3, 1990

[30] Foreign Application Priority Data

Jul. 7, 1989 [JP] Japan .................................. 1-176412

[51] Int. Cl.[5] ............................................. H01J 49/06
[52] U.S. Cl. ................................... 250/287; 250/286; 250/397
[58] Field of Search ............... 250/282, 286, 283, 282, 250/281, 299, 300, 397; 324/71.4, 452

[56] References Cited

U.S. PATENT DOCUMENTS

| | | | |
|---|---|---|---|
| 2,778,944 | 1/1957 | Harrington | 250/287 |
| 3,777,159 | 12/1973 | Hammond et al. | 250/283 |
| 3,955,084 | 5/1976 | Giffin | 250/299 |
| 4,072,862 | 2/1978 | Mamyrin et al. | 250/287 |
| 4,314,156 | 2/1982 | Kuppermann et al. | 250/282 |

Primary Examiner—Jack I. Berman
Assistant Examiner—Kiet T. Nguyen
Attorney, Agent, or Firm—Oblon, Spivak, McClelland, Maier & Neustadt

[57] ABSTRACT

Charged particles are generated and are subjected to a spatial distribution. Images of the distributed charged particles are formed on a screen and are processed to count the number of the charged particles.

5 Claims, 5 Drawing Sheets

METHOD AND APPARATUS FOR COUNTING CHARGED PARTICLES

BACKGROUND OF THE INVENTION

1. Field of the Invention

This invention relates to the precision counting of electrons, ions and other charged particles, as required for physical measurements of surfaces and in many other fields. It particularly relates to a method and apparatus for counting charged particles generated in a short time of within several dozen nanoseconds.

2. Prior Art Statement

FIGS. 1 to 3 show the configuration of a conventional apparatus for measuring the number (intensity) of charged particles. FIG. 1 is drawing of a conventional apparatus used for measuring large numbers of continuously incident charged particles. Charged particles 1 are collected by a current collector 2 and an ammeter 3 is used to measure the charges carried by the charged particles 1. Among the advantages of this method are that the measuring system is simple and offers good reliability when there are large numbers of incident charged particles.

For the counting of small numbers of incident particles and when the current regions are so small as to be approaching the limits of current measurement, as shown in FIG. 2, the system is provided with charge multiplication gain functions such as constituted by a electron multiplier 4 or the like arranged as the front end of a current collector 2, and power from a power source 5 is applied to the electron multiplier 4 to increase the total current of the charged particles incident on the electron multiplier 4 and to carry out the counting by means of an ammeter 3.

An advantage of this method is that for each charged particle 1 incident on the cathode of the electron multiplier 4 a multiplicity of secondary electrons are emitted, ultimately enabling around $10^6$ to $10^8$ electrons to be generated, so that even when the number of incident particles is relatively low (in the picoampere range) the signal level can be increased to enable current measurement to be carried out.

In contrast to these current measuring methods in which total collector current is measured, in the apparatus shown in FIG. 3, a charged pulse amplifier 6 and a pulse counting unit 7 are provided in the following stage of the current collector 2 and the number of pulses generated each time a charged particle 1 enters the electron multiplier 4 is counted using a pulse counting unit (pulse counting method).

Among the advantages of this method are that it can be applied to absolute counts of incident particles and it offers a good level of counting reliability even when the numbers of incident particles are low.

However, each of the above conventional methods have drawbacks, as described below. With the arrangement of FIG. 1, when the number of incident particles is low or in the case of incident particle pulses, owing to factors including the response characteristics of available ammeters, it is impossible to obtain a correct measurement of the number of particles in terms of the amount of current. For example, with generally available ammeters, even highly sensitive ones, the current intensity is limited to around $10^{-12}$ (in terms of numbers of incident particles, this is equivalent to $10^7$/sec).

With the arrangement of FIG. 2, while the overall signal level is increased, easing the current measurement conditions, owing to the fact that the absolute value of the multiplication gain of the electron multiplier 4 used to detect the charged particles is not known the absolute number of incident charged particles cannot be found. Furthermore, since in the course of the multiplication gain process it is statistically impossible to avoid some fluctuation in the multiplication factor of the electron multiplier 4, the multiplication gain varies from particle to particle, so that even when the numbers of particles incident on the electron multiplier 4 are the same, there is a risk that they will be measured as a different output current value. Moreover, if this method is used to count charges when the particles are generated as pulses, the response characteristics of the ammeter connected downstream of the electron multiplier remains a problem.

Also, while numbers of particles counted with the arrangement shown in FIG. 3 can be made to correspond to absolute numbers of incident particles, the dead time of the electron multiplier and the pulse counting system response characteristics limit count ratios to, at most, a few particles per several tens of nanoseconds, and larger numbers of incident particles that will give rise to a counting loss.

Thus, there are major drawbacks with each of the above conventional methods which make it impossible to achieve particle counts with high reliability when the numbers of particles generated are relatively low, meaning from several to several hundred particles, and the generation takes place in an extremely short time, such as the several tens of nanoseconds in which ionized particles are generated by a pulsed laser beam.

OBJECT OF THE INVENTION

An object of the present invention is to provide a method and apparatus for counting charged particles which provides highly reliable counting of charged particles when the numbers of the charged particles generated are relatively low and they are generated in a short time, and when the particles are generated in large numbers.

SUMMARY OF THE INVENTION

To achieve the above object, the charged particle counting method according to present invention comprises spatially distributing generated charged particles, forming a screen image of the distributed charged particles and processing the screen image to count the number of particles on the screen.

The method of the present invention also comprises counting specific particles from among the multiplicity of particles generated in a short time by passing the spatially distributed charged particles through a time-of-flight mass separator to have the particles arrive at a gate with a time delay corresponding to the differences in the mass of the particles, having only the particles which are to be detected pass the gate, forming a screen image of these particles, and counting the particles by processing the screen images.

With the arrangement of the present invention described above, since a screen image of the spatially distributed charged particles is formed and the number of bright spots on the screen, which is the number of charged particles, is counted after freezing the screen image, even though it takes time to count the particles, there is no counting loss.

Furthermore, in this invention, even when there are several thousand incident charged particles in the space of several tens of nanoseconds, by forming screen images of the particles at a distribution which is sufficient to ensure that there is no spatial overlapping of particle images, missed counts are minimized, markedly improving the effective count ratio, enabling counting to be performed effectively.

Furthermore, in accordance with this invention, charged particles are counted by counting the number of bright spots on the screen and the count is not affected by differences in the brightness of the spots. Therefore, providing a microchannel plate in front of the screen ensures that counts will not be affected by variations in the multiplication gain factor.

Thus, in accordance with the present invention, in addition to being able to count relatively low numbers of particles ranging from one to several hundred, generated in a short space of time, for example several tens of nanoseconds, the invention can also be applied for counting particles generated in relatively large numbers such as in the order of one thousand.

Other objects and features of the invention will be apparent from the accompanying drawings and following detailed description of the invention.

DETAILED DESCRIPTION OF THE PREFERRED EMBODIMENT

In accordance with the present invention, first, a multiplicity of generated charged particles are spatially distributed such as by, for example, passing the particles through a defocussed electrostatic lens and forming an image of the distributed particles on a fluorescent screen or other such screen.

The implementation is not limited to the use of a fluorescent screen; any other means may be utilized which is able to produce images of the distributed charged particles as bright spots. To improve the brightness of the screen images, a microchannel plate or the like with multiplication gain functions may be disposed in front of the screen. A CCD camera or other such means is used to acquire an image of the bright spots formed on the screen. The image is then stored in a frame buffer and the bright spots, corresponding to the charged particles are counted by an image processing unit which has the ability to count bright spots on the screen, such as a particle counter.

To count charged particles of a specific element, the particles are passed through a time-of-flight mass separator which delays the time each particle arrives at a gate by an amount corresponding to the mass of the particle concerned. The gate passes only those of the charged particles which are to be counted, and an image of these particles is formed on the screen. The gate may be constituted by a mesh electrode, or the like, to which is applied an electrical field which normally repulses that of the incident charged particles. To ensure that only the required charged particles are passed, an attracting field is applied in pulses that coincide with the arrival time of the target particles, and particle images are then formed on the screen and counted by the method described above.

Figure 1:
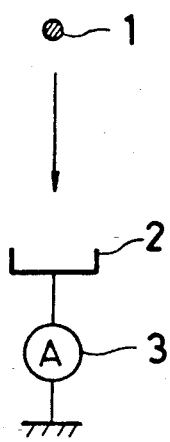
FIG. 1 is an explanatory view of a conventional charged particle measuring method using an ammeter.
Figure 2:
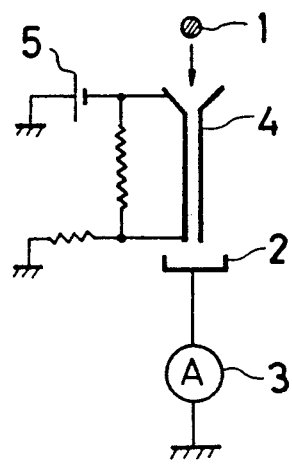
FIG. 2 is an explanatory view of a conventional charged particle measuring method which uses an ammeter provided with a current gain function.
Figure 3:
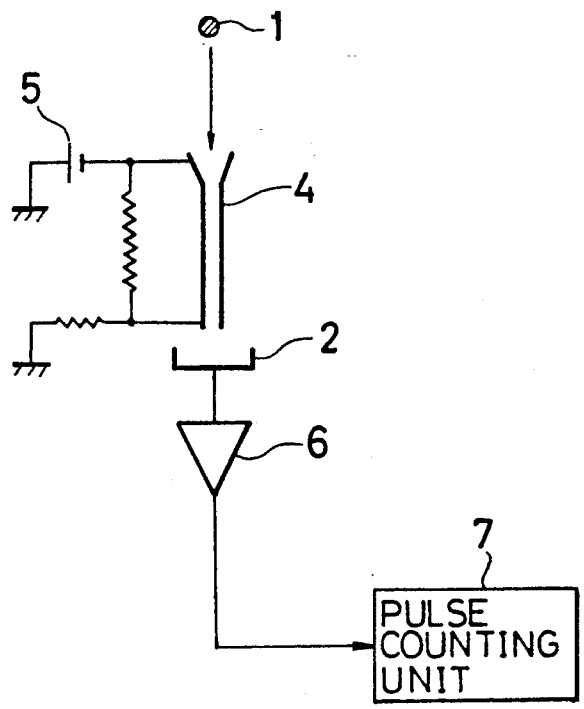
FIG. 3 is an explanatory view of a conventional charged particle counting method which uses a pulse counting system.
Figure 4:
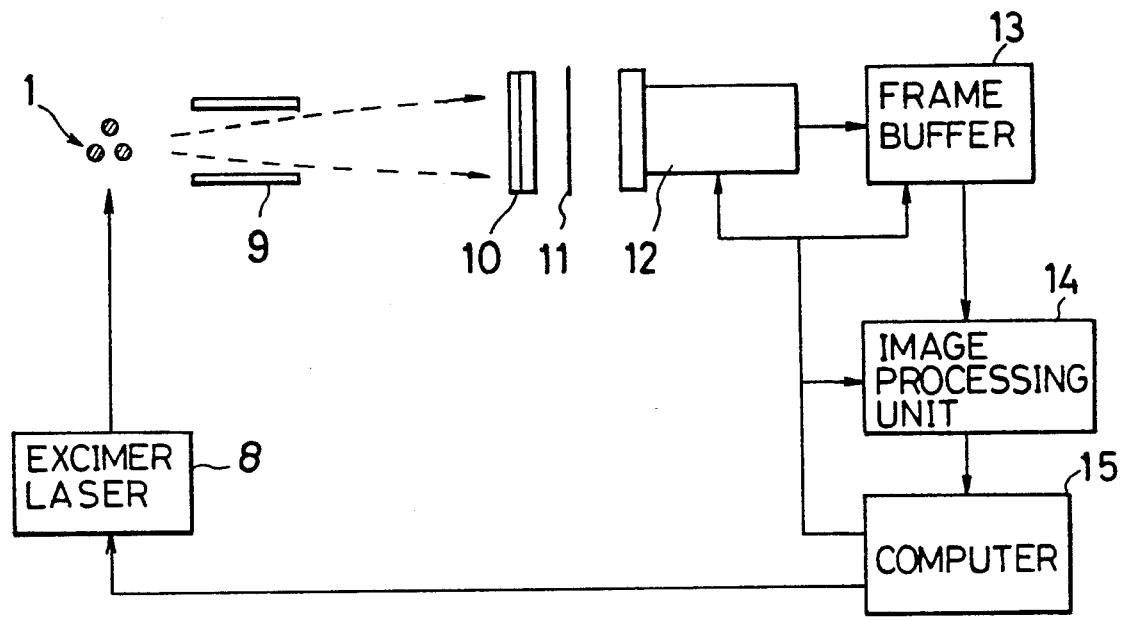
FIG. 4 is a schematic view showing an embodiment of the charged particle counting apparatus according to the present invention.

FIG. 4 illustrates the principle of an apparatus for carrying out the method of this invention, whereby charged particles, in this case ions generated by an excimer laser with a pulse width of about 30 nanoseconds, are counted using image processing. Ions generated by the excimer laser 8 pass through a defocussed electrostatic lens 9 and are projected onto a screen 11. In this embodiment, the screen 11 has a fluorescent screen 11 with a decay time in the millisecond range disposed on the particle exit side. On the incident particle side of the screen 11, a dual microchannel plate 10 is located. Each of the microchannels of the plate 10 has a diameter in the order of ten microns and a minimum effective diameter of 30 mm, providing around one million input channels. Taking into consideration the spread of the dual microchannel plate 10, the size of the bright spots on the fluorescent screen 11 is a maximum of around 100 microns.

The spatially distributed images of the incident ions which appear as bright spots on the fluorescent screen 11 are acquired using a CCD camera 12 with a millisecond-order shutter speed, and the acquired images are stored in a frame buffer 13. The images in the frame buffer 13 are counted by an image processing unit 14 equipped with a particle counter, or the like, for counting the number of bright spots on the screen 11.

The operation of the excimer laser 8, CCD camera 12 with shutter function and the frame buffer 13 and the image processing unit 14 which includes particle counter is synchronized by means of a personal computer 15 for an excimer laser 8 repetition pulse frequency in the order of several dozen hertz.

Figure 5:
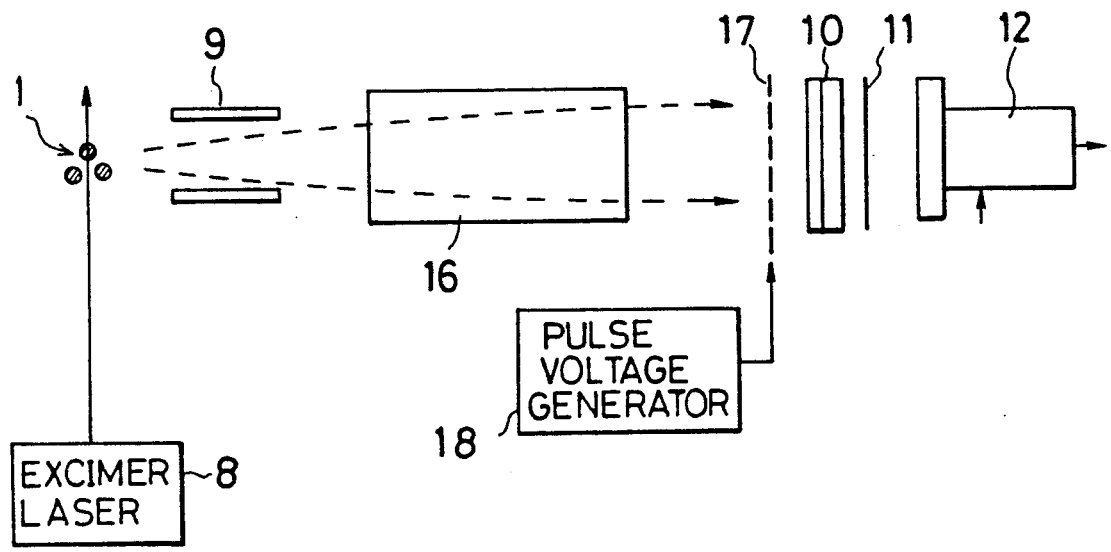
FIG. 5 is a schematic view showing another embodiment of the charged particle counting apparatus according to the present invention.

To count particles of a specific element from among the particles generated using the excimer laser 8, a time-of-flight mass separator 16 and mesh electrode 17 are disposed between the electrostatic lens 9 and the microchannel plate 10, as shown in FIG. 5.

In this case, the charged particles 1 spatially distributed by the defocussed electrostatic lens 9 reach the mesh electrode 17 with a time-of-flight differential produced in the time-of-flight mass separator 16 in accordance with particle mass differentials. A pulse voltage generator 18 normally applies to the mesh electrode 17 an electrical DC field which repulses that of the incident charged particles and, only at the arrival of the target particles, applies an attracting field in the form of pulses to the mesh electrode 17.

Hence, the mesh electrode 17 passes only those element particles which are specified for detection, and images of these particles are formed on the fluorescent screen 11 as bright spots which are counted.

Thus, in accordance with the present invention, relatively few or many charged particles generated in a short time can be counted with minimal counting loss one particle at a time, which is not possible with the conventional arrangement, and the count ratio is improved, going as high as $10^{11}$ to $10^{12}$, when converted to counts per second.

Examples of particle counting in accordance with the present invention will now be described.

Figure 6:
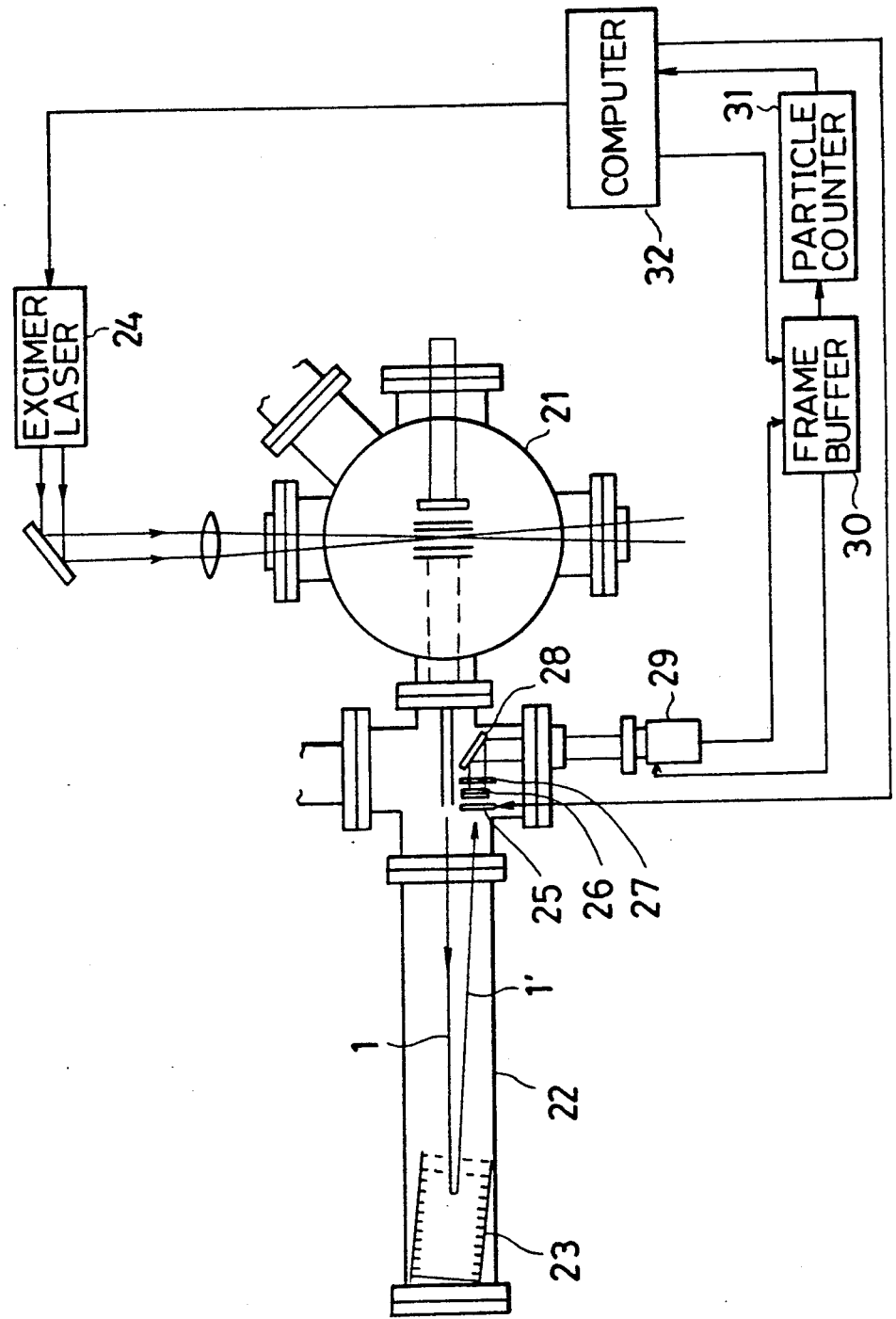
FIG. 6 shows a charged particle counting apparatus for carrying out the method of the invention.

FIG. 6 shows the arrangement of the apparatus used for the counting of charged particles. A time-of-flight mass analyzer 22 about 1,000 mm in length is connected to a stainless steel vacuum chamber 21 with a diameter of 400 mm. An ion reflector 23 is provided at one end of the mass analyzer 22 to reflect charged particles coming from the vacuum chamber 21. The reflected particles pass through a mesh electrode 25, are multiplied at the microchannel plate 26 yielding the bright spots on the fluorescent screen 27, and the screen image is refracted by a reflecting mirror 28 to a camera 29 located outside the apparatus.

The image intensifier (model F224-21P manufactured by Hamamatsu Photonics K. K., Japan) used is integrally constituted of the dual microchannel plate 26 and fluorescent screen 27. The fluorescent screen 27 has a P20 phosphor with a persistence of about 1 ms. As the camera 29 for acquiring the screen image of the particle bright spots a commercial CCD camera with an F 1.2 Nikkor lens was used. For the frame buffer 30 for storing the images from the camera 29, an image freezer (TKIF-66 made by Microtechnika K. K., Japan) was used which can store images of 768 (horizontal) by 493 (vertical) pixels at a resolution of eight bits. The particle counter 31 (the C1172 made by Hamamatsu Photonics K. K.) can count binarized bright spots at a TV scan rate, and a 16-bit personal computer 32 (NEC 9801 manufactured by NEC Corp., Japan) is used to control the overall system.

The vacuum chamber 21 was filled with acetone molecules ($CH_3COCH_3$, ionization potential of 9.69 eV) which was ionized by irradiation with the Xe-Cl excimer laser 24 (308 nm, 4.03 eV). The ionized acetone molecules were reciprocated a distance of about 1,000 mm in the mass analyzer 22, reaching the fluorescent screen 27 after about 27 microseconds.

The acetone molecules were introduced into the chamber 21 at a pressure of $4.0 \times 10^{-3}$ Pa, and 100 shots of incident laser whose power is of 100 mJ per pulse were used. Counting the bright spots on the screen 100 times yielded a maximum of 481 and a minimum of 371, and an average count for the 100 shots of 435.

Figure 7:
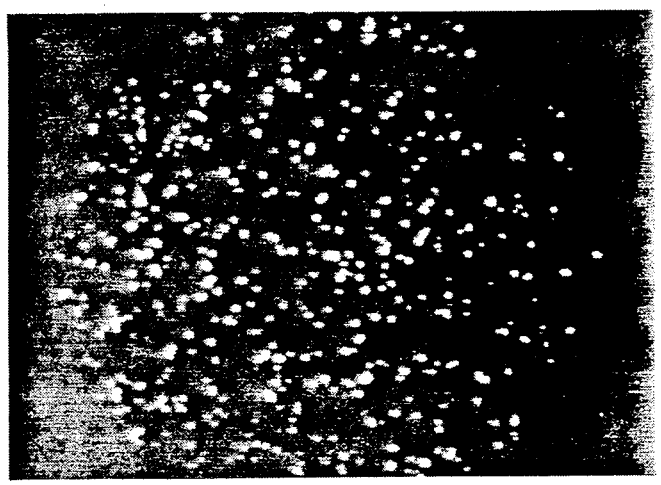
FIG. 7 is a photograph showing the distribution of acetone molecules as bright spots on the screen.

FIG. 7 shows a photograph of the bright spot distribution for one shot on the screen, from which it can be seen that as the particles are counted as screen images, particles generated in a short time can be counted accurately.

Figure 8:
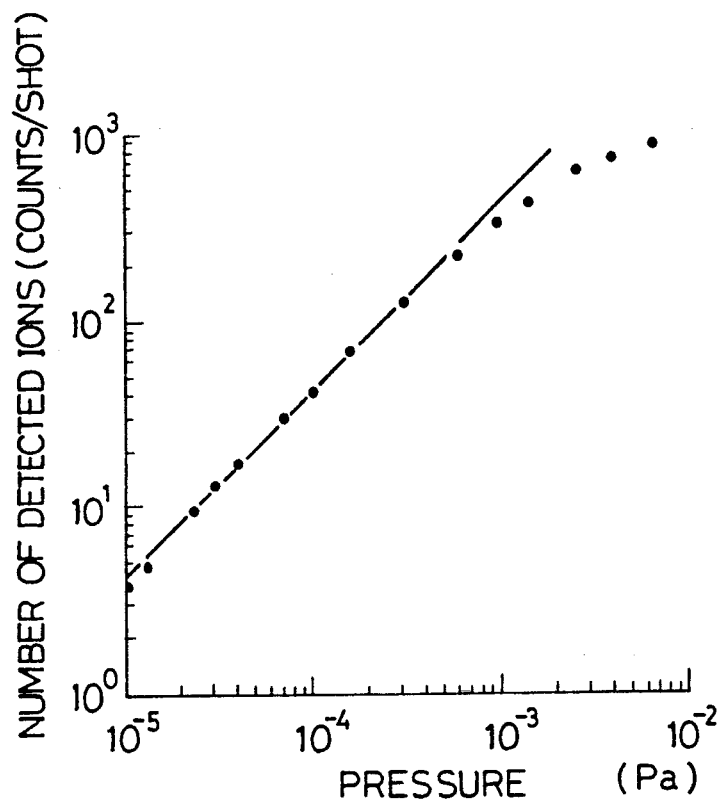
FIG. 8 is a graph showing the relationship between the number of acetone molecules counted using the apparatus of FIG. 6 and the acetone supply pressure.

The acetone molecule introduction pressure used was then varied in the range $1 \times 10^{-2}$ to $1 \times 10^{-5}$ Pa, and after 100 shots the bright spots on the screen were counted and the average count per pulse calculated. The results are shown in FIG. 8, from which it can be seen that up to a pressure of $10^{-3}$ Pa the relationship between the introduction pressure and the ion count is roughly linear, but over $10^{-3}$ Pa the calculated ion values tend to decrease. This is thought to be the result of the increased ion density causing contact between bright spots, and then such multiple bright spots being counted as single bright spots.

Next, using the above approach, an aluminum target was placed in the chamber 21 and bombarded with an ion beam, and the sputtered neutral atoms were then ionized by the excimer laser 24 to generate aluminum photo-ions. These photo-ions were then passed through the mass analyzer 22 to the mesh electrode 25. A charge of 1.350 v is normally applied to the mesh electrode 25 to stop the passage of ions. By applying pulses with a peak of $-100$ v and a width of 1 microsecond timed to coincide with the arrival of the photo-ions at the mesh electrode, the aluminum ions are allowed to pass through the mesh electrode 25 to form bright spot images on the screen 27. These bright spots are then counted by a particle counter 31.

Figure 9:
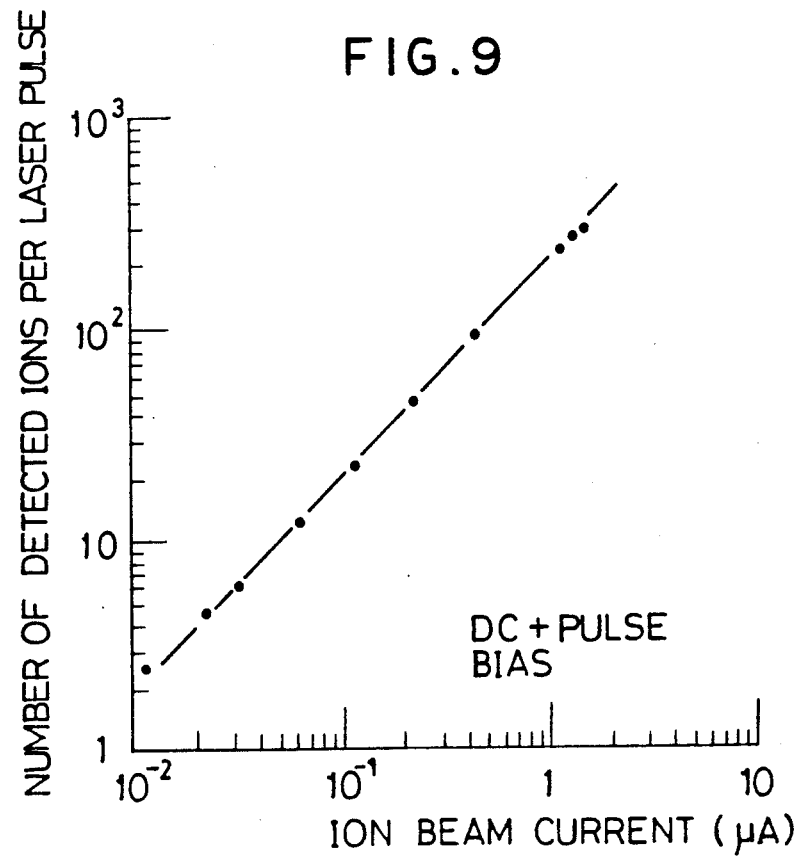
FIG. 9 is a graph showing the relationship between the ion beam current and the number of aluminum photo-ions detected using the apparatus of FIG. 6.

FIG. 9 shows counts of aluminum photo-ion generated using an ion beam bombardment current ranging from $10^{-2}$ to 2 microamperes. It can be seen that the ion count increases in proportion to the ion beam current, showing it is possible to count just the aluminum ions.

Thus, it is possible to count specified ions by timing the pulses to coincide with the arrival of the target ions at the mesh electrode.

As described above, according to the present invention it is possible to precisely detect one by one not only a small number of charged particles but also a great number of charged particles generated in a short period of time by the counting method of the present invention and to increase the count coefficient, i.e. to count $10^{11}$ to $10^{12}$ charged particles per second.

What is claimed is:

1. A method for counting charged particles comprising:

spatially distributing generated charged particles without selecting the particles with reference to energy and mass thereof, forming screen images of the distributed charged particles and counting the particles by processing the screen images.

2. A method for counting charged particles comprising:

spatially distributing a multiplicity of generated charged particles without selecting the particles with reference to energy and mass thereof and passing the charged particles through a time-of-flight mass separator to have the particles arrive at a gate with a time delay corresponding to the differences in the mass of the particles, opening the gate only for a prescribed time period after the delay time corresponding to the time the charged particle arrived at the gate thereby having only the particles which are to be detected pass the gate, forming a screen image of particles and counting the particles by processing the screen images.

3. An apparatus for counting charged particles comprising:

electrostatic lens for spatially distributing generated charged particles without selecting the particles with reference to energy and mass thereof; a screen for producing an image of the distributed charged particles; camera means for acquiring screen images of the charged particles as bright spot images; a frame buffer for storing the acquired images; and a particle counter for counting the bright spots stored in the frame buffer.

4. An apparatus for counting charged particles according to claim 3 further comprising a time-off-flight mass separator and a gate which passes only target charged particles by being open only for a prescribed time period when the prescribed time period corresponding to the time the charged particles arrive at the gate, provided between said electrostatic lens and said screen,.

5. An apparatus for counting charged particles according to claim 4 wherein the gate is a mesh electrode to which is applied an attraction field only for a time period from the time the charged particles of the target element arrive at the gate to the time required for the charged particles to pass through the gate.

* * * * *